(12) United States Patent
De Rosa et al.

(10) Patent No.: US 11,425,658 B2
(45) Date of Patent: *Aug. 23, 2022

(54) INTERFERING DEVICE IDENTIFICATION

(71) Applicant: AT&T Intellectual Property I, L.P., Atlanta, GA (US)

(72) Inventors: Giuseppe De Rosa, Atlanta, GA (US); Joseph Thomas, Marietta, GA (US); Feiling Jia, Pleasanton, CA (US); Mario Kosseifi, Roswell, GA (US); Ronald Kiefer, Louisville, KY (US); Xidong Wu, San Ramon, CA (US); Richard John Mountford, Gambrills, MD (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 76 days.

This patent is subject to a terminal disclaimer.

(21) Appl. No.: 17/013,113

(22) Filed: Sep. 4, 2020

(65) Prior Publication Data
US 2020/0404590 A1    Dec. 24, 2020

Related U.S. Application Data

(63) Continuation of application No. 15/990,022, filed on May 25, 2018, now Pat. No. 10,772,043.

(51) Int. Cl.
*B64C 39/02* (2006.01)
*H04W 28/02* (2009.01)
(Continued)

(52) U.S. Cl.
CPC ....... *H04W 52/0238* (2013.01); *B64C 39/024* (2013.01); *H04W 28/0236* (2013.01); *H04W 52/146* (2013.01); *B64C 2201/146* (2013.01)

(58) Field of Classification Search
CPC ..... H04W 24/00; H04W 24/08; H04W 24/10; H04W 28/0205; H04W 28/0226;
(Continued)

(56) References Cited

U.S. PATENT DOCUMENTS

| 8,666,319 B2 | 3/2014 | Kloper et al. |
| 9,385,819 B2 | 7/2016 | Yoshimoto et al. |

(Continued)

FOREIGN PATENT DOCUMENTS

WO    WO 20170120110    7/2017

OTHER PUBLICATIONS

Phuc Nguyen, Mahesh Ravindranathan, Richard Han, and Tam Vu, "Investigating Cost-Effective RFBased Detection of Drones," 2016, pp. 17-22, Proceedings of the 2nd Workshop on Micro Aerial Vehicle Networks, Systems, and Applications for Civilian Use ACM, University Of Colorado.

(Continued)

*Primary Examiner* — Alpus Hsu
(74) *Attorney, Agent, or Firm* — Amin, Turocy & Watson, LLP

(57) ABSTRACT

Example methods and systems are disclosed to facilitate detection and identification of devices connected to a cellular network and that are causing interference to the cellular network. An example method may include receiving, by a serving base station of the device, a first set of information associated with data communications of a device utilizing a cellular network. The method may further include determining the device is an interfering device based on the first set of information associated with the data communication substantially corresponding with an interfering device profile, and in response tracking the device. During the tracking of the device, a second set of information associated with the data communications from the device may be obtained, and (Continued)

an interfering device type of the device may be determined based on the second set of information. An action may be performed on the interfering device based on its interfering device type.

20 Claims, 5 Drawing Sheets

(51) Int. Cl.
*H04W 52/02* (2009.01)
*H04W 52/14* (2009.01)

(58) Field of Classification Search
CPC ......... H04W 28/0231; H04W 28/0236; H04W 28/0268; H04W 52/0225; H04W 52/0238; H04W 52/0245; H04W 52/146; B64C 39/024; B64C 2201/00; B64C 2201/02; B64C 2201/12; B64C 2201/14
See application file for complete search history.

(56) References Cited

U.S. PATENT DOCUMENTS

| | | | |
|---|---|---|---|
| 9,412,278 | B1 | 8/2016 | Gong et al. |
| 9,426,692 | B2 | 8/2016 | Abdelmonem et al. |
| 9,497,636 | B2 | 11/2016 | Koskinen et al. |
| 9,577,773 | B2 | 2/2017 | Solondz |
| 9,607,281 | B2 | 3/2017 | Lee et al. |
| 9,792,613 | B2 | 10/2017 | Gong et al. |
| 9,805,273 | B1 | 10/2017 | Seeber et al. |
| 9,805,372 | B2 | 10/2017 | Gong et al. |
| 9,843,347 | B2 | 12/2017 | Botchway et al. |
| 9,853,713 | B2 | 12/2017 | Jalali |
| 9,862,489 | B1 | 1/2018 | Weinstein et al. |
| 9,870,566 | B2 | 1/2018 | Gong et al. |
| 10,284,263 | B2 | 5/2019 | Ahmadi |
| 10,530,406 | B2 | 1/2020 | Botchway et al. |
| 2006/0171327 | A1 | 8/2006 | Durand et al. |
| 2016/0330771 | A1 | 11/2016 | Tan |
| 2017/0039413 | A1 | 2/2017 | Nadler |
| 2017/0045884 | A1 | 2/2017 | Kablaoui |
| 2017/0092138 | A1 | 3/2017 | Trundle et al. |
| 2017/0171761 | A1 | 6/2017 | Guvenc |
| 2017/0171868 | A1 | 6/2017 | Reis et al. |
| 2017/0195945 | A1 | 7/2017 | Solomon et al. |
| 2017/0234724 | A1 | 8/2017 | Naguib et al. |
| 2017/0235018 | A1 | 8/2017 | Foster et al. |
| 2017/0295069 | A1 | 10/2017 | Sweet et al. |
| 2017/0351254 | A1 | 12/2017 | Listwin et al. |
| 2017/0358221 | A1 | 12/2017 | Priest |
| 2017/0371353 | A1 | 12/2017 | Mellinger |
| 2018/0026708 | A1 | 1/2018 | Priest |
| 2018/0027517 | A9 | 1/2018 | Noonan |
| 2018/0375568 | A1 | 12/2018 | De Rosa et al. |

OTHER PUBLICATIONS

Allistair Moses, Matthew J. Rutherford, and Kimon P. Valavanis, "Radar-Based Detection and Identification for Miniature Air Vehicles," 2011 IEEE International Conference on Control Applications (CCA), Part of 2011 IEEE International Conference on IEEE, Sep. 28-30, 2011, pp. 933-940, Denver, CO.

Sai Ram Ganti and Yoohwan Kim, "Implementation of Detection and Tracking Mechanism for Small UAS," 2016 International Conference on Unmanned Aircraft Systems (ICUAS), 2016 International Conference, Jun. 7-10, 2016, pp. 1254-1260, FrDTT1.4, IEEE.

Krista Brouwer, Thomas Cottam, Catherine Livolsi, and Stephen Pratt, "Eye in the Sky—Drone Detection & Tracking System—Airport Cooperative Research Program: University Design Competition for Addressing Airport Needs, 2014-2015," 2015, 56 Pages, The University of Rhode Island College of Engineering.

Non-Final Office Action for U.S. Appl. No. 15/990,022 dated Sep. 13, 2019, 24 pages.

Final Office Action for U.S. Appl. No. 15/990,022 dated Feb. 21, 2020, 06 pages.

Notice of Allowance for U.S. Appl. No. 15/990,022 dated Apr. 29, 2020, 17 pages.

INTERFERING DEVICE IDENTIFICATION

CROSS-REFERENCE TO RELATED APPLICATIONS

The present application is a continuation of U.S. patent application Ser. No. 15/990,022 (now U.S. Pat. No. 10,772,043), filed May 25, 2018 and entitled "Interfering Device Identification," which is hereby incorporated by reference in its entirety.

FIELD OF THE DISCLOSURE

This disclosure relates generally to aerial devices and, more particularly, to identifying interfering devices communicating with a cellular network.

BACKGROUND

Unmanned aerial vehicles (UAVs), also referred to as drones or unmanned aerial systems (UASs), may be mobile platforms capable of acquiring (e.g., sensing) information, delivering goods, handling objects, and/or performing other actions, in many operating scenarios/applications. UAVs may be utilized to travel to remote locations that are inaccessible to manned vehicles, locations that are dangerous to humans, and/or any other locations more suited for unmanned vehicles than manned vehicles. Upon reaching such locations, drones can perform many actions, such as acquiring sensor data (e.g., audio, image, video, and/or other sensor data) at a target location, delivering goods (e.g., packages, medical supplies, food supplies, engineering materials, etc.) to the target location, handling objects (e.g., retrieving objects, operating equipment, repairing equipment, etc.) at the target location, and so forth. In the various operating scenarios/applications, the actions performed by the UAVs may require navigating the UAVs and maintaining network connectivity, such as connectivity to a cellular network.

SUMMARY

The systems and methods of the present disclosure provide for detection and identification of interfering user equipment (UEs) on a cellular network. Specifically, high interfering UEs such as unmanned aerial vehicles (UAVs) and/or other aerial devices may be present on the network. The systems and methods determine whether any of the UEs in network environment is interfering with the network based on a first set of information received from the UE. If the UE is classified as an interfering device, the systems and methods of the present disclosure track and obtain a second set of information from the interfering device to determine an interfering device type. Various actions on the network may be performed based on the interfering device type to mitigate the interference generated when in active mode (e.g., performing uplink power control to help ensure that a UE transmits with sufficient power to maintain connectivity, while minimizing interference to the network, reduce throughput/payload requirements to reduce signal quality targets required to sustain the interfering device and/or other actions).

Embodiments of the present disclosure include a method of identifying an interfering device connected to a cellular network. The method includes a first set of information associated with data communications of a device utilizing a cellular network being received. A determination is made as to whether the device is an interfering device based on the first set of information associated with the data communication substantially corresponding with an interfering device profile. The device is then tracked if it is an interfering device, and during the tracking of the device, a second set of information associated with the data communications from the device is obtained. From the second information a device type of the device is determined with a given level of accuracy.

Embodiments of the method also include a performance of a mitigation action on the cellular network based on the device type of the device that is an interfering device and in active interfering mode.

In various embodiments of the method at least a portion of the first set of information is provided in a measurement report from the device and that includes received signal strength and quality measurements by the device. The determination that the device is an interfering device is based on the measurements satisfying a predetermined set of thresholds generated to identify a radio frequency profile of an interfering device.

In various embodiments of the method, the second set of information includes at least one of a speed of the device and location of the device over a time period for pattern recognition, a service type recognition, throughput asymmetry between uplink and downlink, persistence the device satisfies a predetermined interference conditions threshold, an altitude of the device, an application being executed by the device, and uplink video streaming detection.

In various embodiments of the method the device comprises an unmanned aerial vehicle. However, in other embodiments, the device may be any UE that causes interference to the cellular network.

The scope of the disclosure is defined by the claims, which are incorporated into this section by reference. A more complete understanding of embodiments of the disclosure will be afforded to those skilled in the art, as well as a realization of additional advantages thereof, by a consideration of the following detailed description of one or more embodiments. Reference will be made to the appended sheets of drawings that will first be described briefly.

Figure 1:
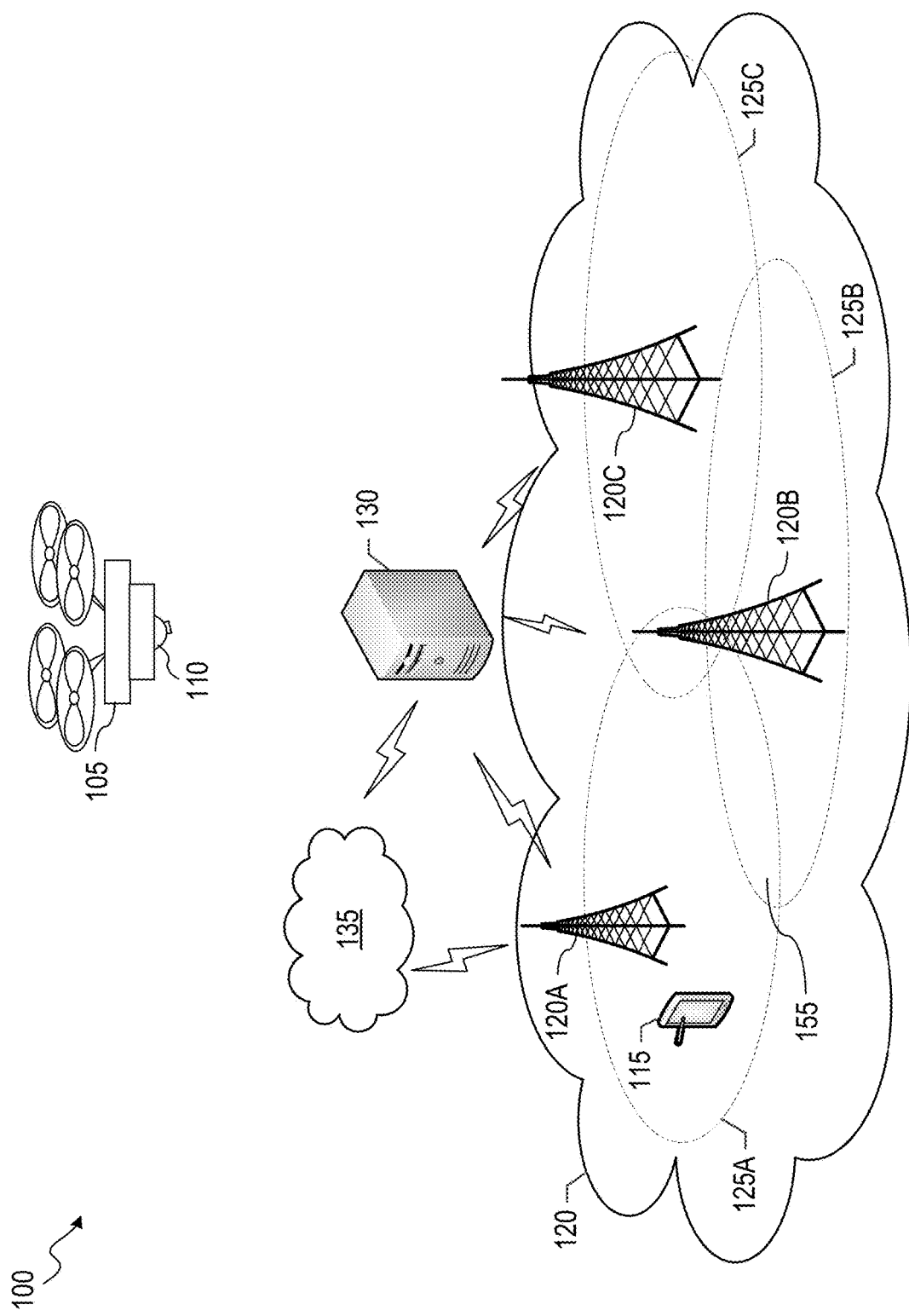
FIG. 1 illustrates an example network environment in which a system for interfering device identification may be implemented in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, where showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

The systems and methods of the present disclosure provide for detection and identification of interfering user equipment (UEs) on a wireless network. Specifically, high interfering UEs such as unmanned aerial vehicles (UAVs) and/or other aerial devices may be present on the network. Traditionally, for example, cellular networks are optimized for user equipment (UEs) connecting at ground level, such as two meters or less off the ground, where typical UEs (e.g., mobile phones) generally operate. In such cases, ground level objects (e.g., buildings and other manmade objects, trees and other natural obstacles, etc.) and geographic conditions (e.g., landforms including hills, mountains, etc. that may affect signal transmissions) may cause signal attenuation. Therefore, cellular base stations are generally optimized based on these factors for devices affected by such obstacles. However, UEs, such as UAVs, at higher altitudes may instead encounter little to no ground level obstructions from ground level objects and may generate signal interference on the cellular network as well as receive interference from multiple base stations.

When a UE is utilizing a serving access point of the wireless network, the UE utilizes capacity of the serving access point while contributing interference to other access points of the wireless network, such as neighboring access points of the serving access point. In the case that the UE is a UAV at flight altitude (or generally any device at flight altitude), interference impact to the wireless network attributed to (e.g., associated with, correlated to, estimated to be caused/contributed by) the UE may be higher than for a ground-based UE due to the generally lower path losses between the UAV and different access points of the wireless network. In this regard, the interference experienced by a neighboring access point may be based at least on a power received by the neighboring access point and perceived as noise from the UE due to a transmission from the UE to the UE's serving access point.

Some UAVs identify themselves as a UAV or are registered as a UAV such that the wireless network may provide dedicated management at connection set up adaptive of the UAVs to facilitate accommodation of UAVs and/or other aerial devices by a wireless network while maintaining network connectivity and mitigating interference to the wireless network. However, some UAVs and/or other UEs do not identify themselves or are not registered as interfering devices. As such, these UAVs and/or other UEs cause interference on the cellular network.

The systems and methods of the present disclosure determine whether a UE on the cellular network is considered an interfering device and identify an interfering device type that the UE is. These determinations are made based on information received about the UE. Based on the interfering device type, the wireless network may perform an action to maintain the network connectivity of the interfering device while mitigating interference to the wireless network.

For example, upon determining the UE is a UAV the wireless network may be coordinated to facilitate maintaining uplink performance characteristics and interference impact of the UAV in accordance with registered UAVs. For instance, connectivity may be maintained by maintaining at least a minimum signal-to-noise ratio (SNR) and/or minimum signal-to-interference-plus-noise (SINR) for signals received by the UAV from its serving access point and/or signals received by the serving access point from the UAV. In a cellular network, uplink power control may be applied on a physical uplink shared channel (PUSCH) for data communication, a physical uplink control channel (PUCCH) for control signal communication, and/or other channels. It is noted that such uplink power control can be applied to aerial-based UEs including UAVs, ground-based UEs, and/or generally any UEs that may connect to access points of the network.

FIG. 1 illustrates an example network environment 100 in which a system for identifying devices interfering with a cellular network may be implemented in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. It is noted that sizes of various components and distances between these components are not drawn to scale in FIG. 1.

The network environment 100 includes a various user equipment (UEs) (e.g., a UAV 105 and a user device 115), a radio access network (RAN) 120, an aerial traffic management system 130, and a core network 135. Base stations 120A-C of the RAN 120 are shown in FIG. 1, although the RAN 120 may include additional base stations. In other cases, a RAN may include fewer or more base stations. The UAV 105, the user device 115, the RAN 120 (e.g., the base stations 120A-C), the aerial traffic management system 130, and the core network 135 may be in communication directly or indirectly. As used herein, the phrases "in communication," "communicatively connected," and variances thereof, encompass direct communication and/or indirect communication through one or more intermediary components and does not require direct physical (e.g., wired and/or wireless) communication and/or constant communication, but rather additionally includes selective communication at periodic or aperiodic intervals, as well as one-time events. In addition, communication with the RAN 120 may include communication with one or more of the base stations 120A-C and/or other components (e.g., base stations) of the RAN 120 not shown in FIG. 1. Similarly, communication with the core network 135 may include communication with one or more components of the core network 135, such as communication with a mobility management entity (MME) of the core network 135.

In an embodiment, the network environment 100 is implemented to form part of a cellular network, such as a 3G, 4G, 5G, and/or other 3GPP-based cellular network, and/or a cellular network based on other cellular standards. In this regard, as an example, the description of FIG. 1 is made herein with respect to the network environment 100 providing a cellular network. The cellular network may be provided by a mobile network operator. In FIG. 1, the cellular network includes the RAN 120, the aerial traffic management system 130, and/or the core network 135. In some cases, the aerial traffic management system 130 may be provided by another party. In some examples, the network environment 100 may be additionally or alternatively implemented to form part of a satellite communication network, a microwave radio network, and/or other wireless networks.

The UAV 105 may include, may be a component of, and/or may be referred to as, a user device or a UE. The UAV 105 may include a flight control unit, communication unit, and payload unit. The flight control unit may be configured to facilitate aerial navigation of the UAV 105, e.g., take off, landing, and flight of the UAV 105. The flight control unit may include any appropriate avionics, control actuators, and/or other equipment, along with associated logic, circuitry, interfaces, memory, and/or code. Additionally, the flight control unit may include a controller that receives flight route information from one or more sources, including a memory and/or an external controller (e.g., set instructions from a service provider and/or in-flight navigation/instructions from an operator) that operates the UAV 105.

The communication unit may include one or more radio transceivers (e.g., antennas) along with associated logic, circuitry, interfaces, memory, and/or code that enable communications, e.g., with the user device 115, the RAN 120 (e.g., one or more of the base stations 120A-C), the aerial traffic management system 130, and/or the core network 135 via wireless interfaces and using the radio transceivers. In FIG. 1, the radio transceivers of the UAV 105 include an antenna 110, which may be omnidirectional or directional. The antenna 110 may be utilized to radiate and/or receive power uniformly in all directions (e.g., omnidirectional antenna), or one or more desired directions (e.g., directional antenna) to allow better performance (e.g., higher signal strength) in the desired direction, such as through higher gain and directivity and reduced interference due to signals from sources deviating from the desired direction. In this regard, signal strength of command/control links and/or application data channels may be improved, and/or interference of signals from different base stations may be reduced through the use of a directional antenna. The antenna 110 may be contained within a housing of the UAV 105, or disposed (e.g., mounted) outside a housing of the UAV 105 as an attachable and/or removable antenna. In some cases, the antenna 110 may be movable along and/or rotatable about one, two, or three axes. In other cases, the antenna 110 may be fixed (e.g., not movable and not rotatable).

The UAV 105 may measure signal strength, signal diagnostics, and/or interferences of signals from the base stations via signals received by the antenna 110 and/or other antenna(s) (e.g., omnidirectional and/or directional antenna) of the UAV 105. The signal strength may be, or may be based on, measures such as received signal strength indicator (RSSI), reference signal received power (RSRP), reference signal received quality (RSRQ), signal-to-noise ratio (SNR), signal-to-interference-plus-noise ratio (SINR), and/or other measures. Such measures of signal strength may be computed by the UAV 105 on signals received from a serving base station of the UAV 105 and surrounding base stations of the serving base station, which may include base stations referenced as neighbor base stations of the serving base station. In an aspect, signal strength may be referred to as signal quality, signal level, or signal power. A higher signal strength is generally associated with better reception. In addition, the antenna 110 and/or other antenna(s) may be used to exchange messages with the RAN 120 (e.g., one or more of the base stations 120A-C) to analyze message reception, clarity, and/or other measurements, as well as detect issues with messaging due to interference.

In an embodiment, the communication unit may send and/or receive information over a cellular technology network (e.g., 3G, 4G, 5G, and/or other 3GPP-based cellular network), such as to and/or from the user device 115, one or more of the base stations 120A-C, and/or the aerial traffic management system 130. In some aspects, the UAV 105 may wirelessly communicate (e.g., via the antenna 110 and/or other antennas) with other devices using other wireless technology, such as IEEE 802.11 standard, Bluetooth® standard, ZigBee® standard, and/or other wireless standards; infrared-based communications; optical-based communications; and/or other appropriate communication standards and/or protocols. In some cases, the UAV 105 may communicate via the antenna 110 using LTE Category-M1 and/or other Internet of Things (IoT)-based communication protocols/technologies. In some cases, the UAV 105 may be configured to communicate with another device using a proprietary wireless communication protocol and interface.

In addition, the communication unit of the UAV 105 may include suitable logic, circuitry, interfaces, memory, and/or code that enable wired communications (e.g., with the user device 115, the RAN 120, the aerial traffic management system 130, and/or the core network 135). In this regard, the UAV 105 may be configured to interface with a wired network, such as via an Ethernet interface, power-line modem, Digital Subscriber Line (DSL) modem, Public Switched Telephone Network (PSTN) modem, cable modem, and/or other appropriate components for wired communication. A wired link may be implemented with a power-line cable, coaxial cable, fiber-optic cable, or other cable or wires that support corresponding wired network technologies. For example, the UAV 105 may utilize wired connections when at or near ground level, such as a wired connection between the UAV 105 and the user device 115 for facilitating testing and/or calibration/setup of the UAV 105.

The payload unit may be configured to implement features supported by the UAV 105 and facilitate implementation of such features. The payload unit may include any equipment and associated logic, circuitry, interfaces, memory, and/or code. The payload unit may include a global positioning system (GPS) that provides a current position of the UAV 105 (e.g., using three coordinates). The position information from the GPS, together with position information of devices in communication with the UAV 105, may allow the UAV 105 to direct a directional antenna to, or to a vicinity of, one or more of these devices. By facilitating establishing and maintaining of connections with higher signal strength, the UAV 105 may facilitate implementation of various features supported by the UAV 105.

Depending on an application(s) of the UAV 105, the payload unit may include one or more onboard sensors, which may be contained within a housing of the UAV 105 or mounted outside the housing of the UAV 105. Such applications of the UAV 105 may be, may include, or may be performed as a part of missions to be performed by the UAV 105. By way of non-limiting example, sensors may include environmental sensors, such as temperature sensors, rain sensors, pressure sensors, humidity sensors, fog sensors, gas sensors, etc., or combination thereof; object/obstacle detection sensors, such as radar sensors, proximity sensors, motion detectors, etc., or combination thereof; imaging sensors (e.g., cameras, video cameras); acoustic sensors, and/or other types of sensors, or combination thereof. Some sensors may be utilized to prevent collisions, and may include other processing features for a collision avoidance system. Alternatively or in addition, the payload unit may include tools, actuators, robotic manipulators, etc., capable of performing an action, such as touching, grasping, delivering, and/or measuring objects. For delivery applications, the payload unit may include the object to be delivered, e.g., the object may be secured within a housing of the UAV 105. The payload unit may also contain rechargeable power sources, such as a rechargeable solar battery and associated solar charging panel or photovoltaic charging source.

The user device 115 may be, and/or may include, a mobile phone, a personal digital assistant (PDA), a tablet device, a computer, or generally any device that is operable to communicate wirelessly (e.g., via cellular standards using antennas) with the UAV 105, the RAN 120, the aerial traffic management system 130, and/or the core network 135. For example, the user device 115 may communicate wirelessly over the cellular network by using the base station 120A as its serving base station. In an aspect, the user device 115 may be a remote control used by an operator (e.g., a human) to provide commands to the UAV 105 when the UAV 105 is within line of sight of the user device 115. For example, the operator may issue commands via the user device 115 to instruct the UAV 105 to fly in certain directions and/or at certain speeds and/or to perform activities such as picking up or delivering an object. In an aspect, the line of sight of the user device 115 may refer to a coverage area or coverage volume within which signals transmitted by the user device 115 to the UAV 105 can be received by the UAV 105 with sufficient signal strength. In some cases, the sufficient signal strength may be a preset threshold level (e.g., SNR level), which may be set during a setup/calibration stage for associating the UAV 105 with the user device 115.

In an embodiment, the UAV 105 and the user device 115 may wirelessly communicate with each other using wireless standards; cellular standards; and/or other cellular standards; infrared-based communication; optical-based communications; and/or other appropriate communication standards and/or protocols. In some cases, the UAV 105 may communicate with the user device 115 using LTE Category-M1, other IoT-based communication protocols/technologies, and/or proprietary wireless communication protocol and interface. In some cases, the UAV 105 and the user device 115 may be configured to communicate over a wired link (e.g., through a network router, switch, hub, or other network device) for purposes of wired communication, e.g., such as during testing, setup, and/or calibration stages between the UAV 105 and the user device 115. The UAV 105 may be at or near ground level to receive a wired connection. The UAV 105 and the user device 115 may be configured to interface with a wired network, such as via an Ethernet interface, power-line modem, DSL modem, PSTN modem, cable modem, proprietary wired communication protocols, and/or other appropriate components for wired communication.

Although a single user device (e.g., the user device 115) is shown in FIG. 1, multiple user devices (e.g., multiple devices owned by or otherwise accessible to the same operator) may be utilized to communicate with the UAV 105. For example, the same operator may communicate with the UAV 105 using the user device 115 (e.g., a tablet device) and/or a mobile phone.

One or more of the base stations 120A-C of the RAN 120 may include, may be a component of, and/or may be referred to as, a cell, a Node B (NB), an Evolved Node B (eNodeB or eNB), or a Home eNB (HeNB). One or more of the base stations 120A-C include suitable logic, circuitry, interfaces, memory, and/or code that enable communications, e.g., with the user device 115, one of the other base stations 120A-C, the aerial traffic management system 130, and/or core network 135 via wireless interfaces and utilizing one or more radio transceivers (e.g., antennas). In an aspect, the base stations 120A-C may transmit (e.g., broadcast) messages that, if received and processed by the UAV 105, provide information to facilitate navigation of the UAV 105 in the airspace. In some cases, the messages transmitted by the base stations 120A-C may be based on information that the base stations 120A-C receive from the core network 135 and/or aerial traffic management system 130. In some cases, one or more of the base stations 120A-C may be mobile (e.g., mobile base stations at ground level, mobile base stations at flight altitudes, mobile naval-based base stations, etc.).

The base stations 120A-C may be macrocell base stations, microcell base stations, picocell base stations, femtocell base stations, and/or other cell sizes. For example, the macrocell base station may provide a coverage area over a radial range up to the tens or hundreds of kilometers, the picocell base station may provide coverage over a radial range in the hundreds of meters, and the femtocell base station may provide coverage over a radial range in the tens of meters. In FIG. 1, the base stations 120A, 120B, and 120C have nominal coverage area 125A, 125B, and 125C, respectively, at ground level or near ground level. The coverage area of a base station may be different in different environments, at different altitudes, at different times, and at different frequency bands. When altitudes are taken into consideration, the coverage area provided by the base stations 120A-C may more appropriately be referred to as a coverage volume, with different coverage areas at different altitudes. In an aspect, a coverage area of a base station may be larger at flight altitudes (e.g., 400 feet) than at lower altitudes such as ground level, due to fewer obstructions at flight altitudes for example. As used herein, the coverage area and coverage volume may be referred to more generally as a coverage region, where the region may be two-dimensional (e.g., coverage area) or three-dimensional (e.g., coverage volume).

The core network 135 may include components (e.g., authentication, authorization, and account (AAA) server, MME, etc.) for managing connections of ground-based UEs (e.g., the user device 115) and/or the aerial-based UEs (e.g., the UAV 105) to the RAN 120, the aerial traffic management system 130, the core network 135, and/or other cellular networks or components thereof (e.g., base stations of other RANs), and process information communicated using these connections. For example, the core network 135 may include and/or may be in communication with, a mobile telephone switching office (MTSO). The core network 135 may include components, such as an MME and/or other components, for authenticating UEs to the cellular network (e.g., authenticating UEs to the RAN 120 and core network 135) and for operating in conjunction with the RAN 120 to determine radio resource management strategy to facilitate connectivity of UEs to the cellular network.

The core network 135 includes suitable logic, circuitry, interfaces, memory, and/or code that enable communications, e.g., with the RAN 120 (e.g., one or more of the base stations 120A-C), aerial traffic management system 130, and/or one or more UEs (e.g., the UAV 105, the user device 115), via wireless interfaces and utilize one or more radio transceivers. In some cases, the core network 135 or components thereof may enable communications with the RAN 120 and aerial traffic management system 130 via wired interfaces.

The aerial traffic management system 130 may facilitate flight of UAVs and/or other aerial devices at flight altitude and maintaining connectivity of such vehicles/devices to the cellular network (e.g., the RAN 120 and core network 135). The aerial traffic management system 130 includes suitable logic, circuitry, interfaces, memory, and/or code that enable communications, e.g., with the RAN 120 (e.g., one or more of the base stations 120A-C), core network 135 (e.g., MME of the core network 135), and/or one or more UEs (e.g., the UAV 105, the user device 115), via wireless and/or wired interfaces and utilize one or more radio transceivers.

In some aspects, the aerial traffic management system 130 (or component(s) thereof) may be a part of the core network 135 that is dedicated to handling UAVs and/or other aerial devices (e.g., authentication, profile information access and/or storage, etc.). Alternatively and/or in addition, the aerial traffic management system 130 (or component(s) thereof) may be separate from the core network 135. For instance, the aerial traffic management system 130 may be provided by another party. In this regard, even when provided by different parties, the aerial traffic management system 130 may share information with the core network 135, and vice versa, to facilitate management of UEs associated with (e.g., connected to, provided connectivity by) the cellular network. For explanatory purposes, operations described as being performed by the aerial traffic management system 130 may be performed at least partially, performed alternatively, and/or performed in addition at the core network 135, and/or vice versa.

In an aspect, the core network 135 and/or aerial traffic management system 130 may be, may include, or may be a part of, a server or server farm that can generate and distribute information to the user device 115 and/or the RAN 120. In some cases, different components (e.g., devices) of the core network 135 and/or aerial traffic management system 130 may be distributed across different geographic locations and/or may manage UEs (e.g., ground-based, aerial-based) and base stations in different geographic locations.

The base stations 120A-C of the RAN 120 may be in communication with the core network 135 and/or the aerial traffic management system 130 through a backhaul network. A UE (e.g., the UAV 105, the user device 115) may communicate with the core network 135 and/or the aerial traffic management system 130 via a serving base station selected by the UE, and the core network 135 and/or the aerial traffic management system 130 may communicate with the UE via the UE's serving base station. The core network 135 and/or the aerial traffic management system 130 may be in direct communication with one or more of the base stations 120A-C or in communication with one or more of the base stations 120A-C through one or more intermediary base stations.

In some aspects, the base stations 120A-C may individually store or otherwise have access to measurement reports (e.g., a Radio Resource Control (RRC) measurement report) from UEs (e.g., the UAV 105 and/or the user device 115).

The UEs may transmit (e.g., periodically, aperiodically) the measurement reports to their respective serving base stations. The serving base stations may transmit (e.g., periodically, aperiodically) the measurement reports and/or information related to (e.g., derived from) the measurement reports to the aerial traffic management system 130 and/or the core network 135. The measurement reports may include signal strengths (e.g., RSSI, RSRP, RSRQ etc.) of signals from the base stations 120A-C that are received and measured by the user devices (e.g., user device 115 and/or the UAV 105) and/or information derived based on the signal strengths. For example, the UAV 105 may measure the signal strengths of signals received by the UAV 105 from the serving base station, neighbor base stations of the serving base station, and/or other base stations, and the UAV 105 may include the signal strengths in the measurement reports. In some cases, the measurement reports of a UE may include information pertaining to signal strength of downlink PRBs, and/or other signal measurements, of the UE's serving base station and neighbor base stations of the serving base station. In some cases, the core network 135 and/or aerial traffic management system 130 may generate, store, maintain, and/or update the measurement reports.

In an embodiment, the aerial traffic management system 130 receives, stores, analyzes, and processes data indicative of impact of UAVs and/or other user devices on the cellular network (e.g., the RAN 120, the aerial traffic management system 130, and/or the core network 135) in different portions of the airspace. The impact may be referred to as an interference impact and is indicative of the effect of accommodating (e.g., expending resources on) the UAVs and/or other user devices at flight altitude by providing the UAVs and/or other user devices connectivity to the cellular network, which is generally designed for use by devices at ground level. Such interference data may be included in and/or derived from the measurement reports received from the UAVs and/or other UEs.

For flight of the UAV 105 within a portion of the airspace (e.g., air corridor or portion thereof), the interference impact associated with the UAV 105 may be based on measurement reports provided by the UAV 105 to its serving base station during flight within the portion of the airspace. The interference impact may be based on noise (e.g., uplink noise) experienced by base stations of the RAN 120 when a UE at flight altitude is flying in the airspace. By way of non-limiting example, the noise caused by the UAV 105 may be based on transmission power used by the UAV 105 for data transmissions to its current serving base station, received signal power of signals (e.g., RSRP and/or RSRQ values) received by the UAV 105 from the current serving base station, and received signal power of signals received by the UAV 105 from surrounding base stations associated with the current serving base station.

As an example, for the UAV 105, the aerial traffic management system 130 may determine interference impact based on information pertaining to uplink and downlink PRB signal quality, uplink and downlink PRB utilization, and/or other information of a serving base station of the UAV 105, the serving base station's neighbor base stations, and/or other base stations. The information may be measured by the UAV 105 and provided by the UAV 105 in the measurement reports. The UAV 105 may also identify (e.g., in the measurement reports) the location (e.g., longitude, latitude, altitude) and time at which the UAV 105 performed the measurements. Such information may be utilized with information in measurement reports from other UEs to determine the interference impact to the cellular network (e.g., to PRBs associated with the RAN 120) that can be attributed to (e.g., correlated to) the cellular network accommodating the UAV 105. The aerial traffic management system 130 may generate interference indices based on the information provided by the UAV 105 and other aerial devices in their respective measurement reports.

In an embodiment, the aerial traffic management system 130 may define portions of the airspace and determine an interference impact associated with accommodation of UEs by the cellular network in each portion of the airspace. In this case, for each portion of the airspace, the interference impact may be based on noise (e.g., uplink noise) experienced by surrounding base stations (e.g., neighbor base stations) of a serving base station of the RAN 120 when the UEs are connected to the serving base station while flying in the portion of the airspace. The interference impact may be represented in terms of noise level per PRB. In some aspects, in a specific portion of the airspace, the aerial traffic management system 130 may determine correlations between levels of uplink noise on a non-serving base station and associated cause (e.g., UAVs operating within the specific portion of the airspace) based on non-serving base station PRB noise level analysis and uplink PRB utilization of UEs flying in the specific portion of the airspace. Different portions of the airspace may experience different interference impact associated with accommodation of UEs operating in the portions of the airspace.

Thus, using various embodiments, the aerial traffic management system 130 may coordinate and monitor traffic associated with UEs flying in the airspace as well as uplink and downlink network traffic associated with servicing such UEs. In this regard, the aerial traffic management system 130 may facilitate accommodation of UEs at flight altitude in the cellular network (e.g., typically optimized for UEs connecting at ground level) while monitoring and controlling impact of such accommodation on UEs that are connecting to the cellular network at or near ground level. In some cases, connectivity to the cellular network and/or flight route generation/management may be provided to subscribed UEs only. In other cases, cellular connectivity and/or flight route generation may be provided to subscribed UEs as well as unsubscribed UEs (e.g., with an additional fee for unsubscribed UEs).

In various embodiments, the aerial traffic management system 130 may generate and coordinate flight routes of UAVs and/or other aerial devices to allow air traffic to be distributed at flight altitude (e.g., to reduce traffic congestion and/or collisions) and/or cellular traffic to be distributed (e.g., to reduce overloading of some base stations and underutilization of other base stations), thus facilitating more efficient use of the airspace and the cellular network. In some cases, the distribution of the cellular traffic may help monitor and control interference impact on the cellular network associated with the UAVs and/or other aerial devices in the airspace.

In addition, the aerial traffic management system 130 may generate communication channel allocation instructions (e.g., also referred to as radio channel allocation instructions, physical channel allocation instructions, or communication channel allocation instructions) and provide these instructions to the RAN 120. The instructions may also be referred to as options or guidelines. The channel allocation instructions may indicate one or more frequency bands, bit rate range (e.g., minimum and/or maximum allowed bit rate), a communication protocol, and/or type/category of LTE technology (e.g., LTE Category M) to be used by the RAN 120 to define a communication channel (e.g., physical communication channel) for the UAV 105 for connecting the UAV 105 to the cellular network.

The channel allocation instructions are used by the base stations 120A-C and/or any base stations of the RAN 120 to assign a communication channel with the UAV 105 when the UAV 105 selects a base station as its serving base station during flight on a flight route. For example, when the UAV 105 selects the base station 120A as its serving base station, the base station 120A may assign a communication channel to the UAV 105 based on radio resource management of the base station 120A within bounds identified by the aerial traffic management system 130 in the channel allocation instructions. In some aspects, different portions of the airspace may be associated with different channel allocation instructions, such as to account for differences in the distribution of available and/or utilized channel resources of the RAN 120 for connecting to UAVs flying in the different portions.

In various embodiments, the aerial traffic management system 130 may generate interference mitigation instructions for the UE. For example, UAV 105 transmit power for different access points of the wireless network may be coordinated to facilitate maintaining uplink performance characteristics and interference impact of the UAV 105 at desired levels. Dedicated uplink power control may be utilized to help ensure that a UE transmits with sufficient power to maintain connectivity, while minimizing interference to the network. For instance, connectivity may be maintained by maintaining at least a minimum signal-to-noise ratio (SNR) and/or minimum signal-to-interference-plus-noise (SINR) for signals received by the UE from its serving access point and/or signals received by the serving access point from the UE. In a cellular network, dedicated uplink power control may be applied on a physical uplink shared channel (PUSCH) for data communication, a physical uplink control channel (PUCCH) for control signal communication, and/or other channels.

Figure 2:
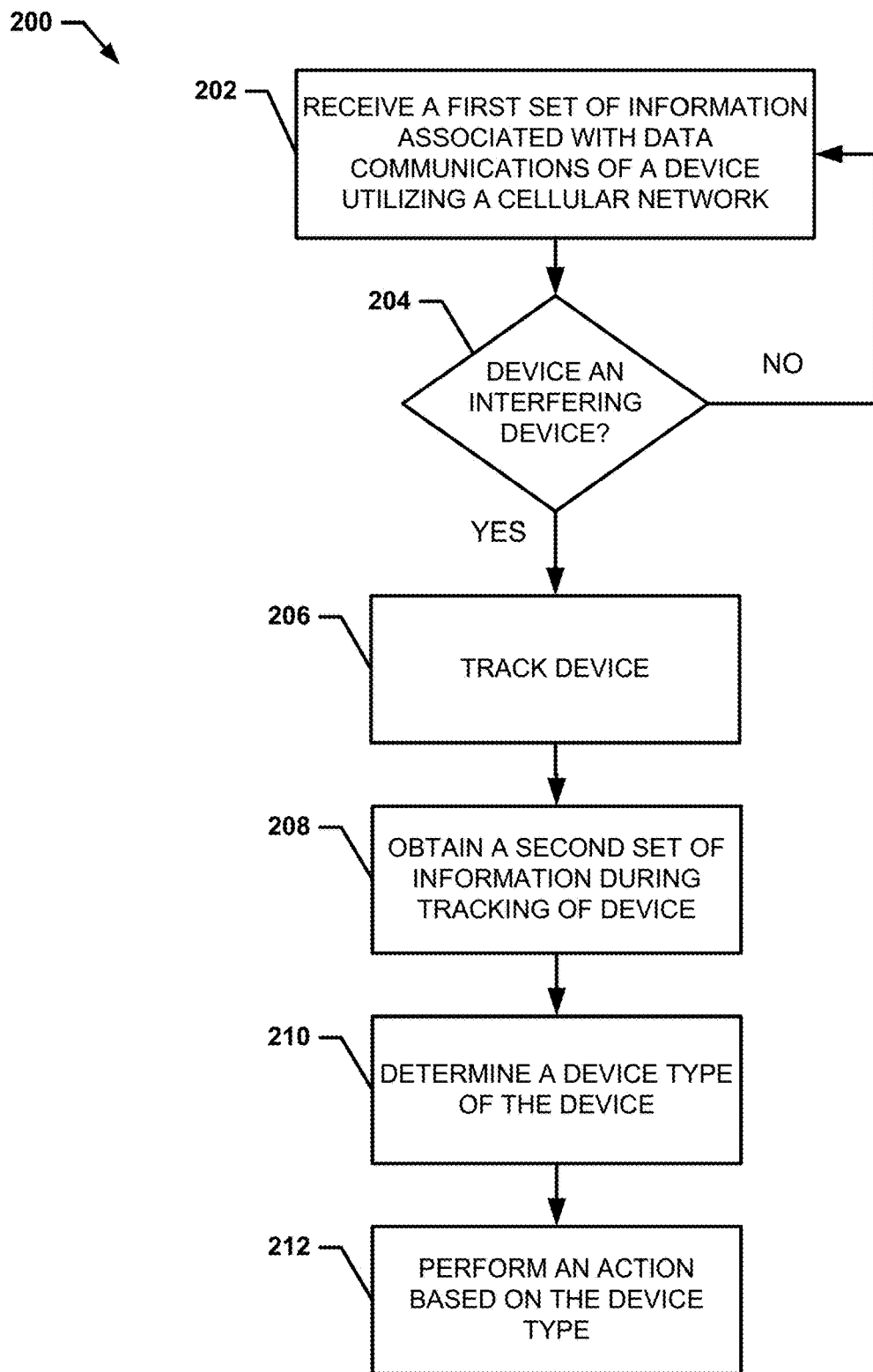
FIG. 2 illustrates a flow diagram of an example process for identifying interfering devices in accordance with one or more embodiments of the present disclosure.

Referring now to FIG. 2 an embodiment of method 200 is illustrated for identifying an interfering device on a cellular network. The method 200 begins at block 202 where a first set of information associated with a communication of a device utilizing a cellular network is received. In an embodiment of block 202 and with reference to FIG. 1, the one or more base stations 120A-120C of the RAN 120, the aerial traffic management system 130, and/or the core network 135 may receive a first set of information from each of the UEs (e.g., the user device 115 and the UAV 105) in the network environment 100. For example, the first set of information may include measurement reports (e.g., an RRC measurement report) discussed above. The UEs may transmit (e.g., periodically, aperiodically) the measurement reports to their respective serving base stations. The serving base stations may transmit (e.g., periodically, aperiodically) the measurement reports and/or information related to (e.g., derived from) the measurement reports to the aerial traffic management system 130 and/or the core network 135.

The measurement reports may include signal strengths (e.g., RSSI, RSRP, RSRQ etc.) of signals from the base stations 120A-C that are received and measured by the user devices (e.g., user device 115 and/or the UAV 105) and/or information derived based on the signal strengths. For example, the UAV 105 may measure the signal strengths of signals received by the UAV 105 from the serving base station, neighbor base stations of the serving base station, and/or other base stations, and the UAV 105 may include the signal strengths in the measurement reports. In some cases, the measurement reports of a UE may include information pertaining to signal strength of downlink PRBs, and/or other signal measurements, of the UE's serving base station and neighbor base stations of the serving base station. The measurement reports may also include other information such as the location (e.g., longitude, latitude, altitude) and time at which the UAV 105 performed the measurements.

The method 200 may then proceed to decision block 204 where a determination is made as to whether the device is an interfering device based on the first set of information. In an embodiment of decision block 204, the one or more base stations 120A-120C of the RAN 120, the aerial traffic management system 130, and/or the core network 135 may determine whether the UE is an interfering device based on the first set of information associated with the data communication. For example, the one or more base stations 120A-120C of the RAN 120, the aerial traffic management system 130, and/or the core network 135 may determine whether the first set of information substantially corresponds with an interfering device profile. For example, the RSRQ and/or the RSRP provided in the measurement report provided by the UAV 105 may be compared to a predetermined interference level for the RSRQ and/or the RSRP. For example, a combination of a relatively high RSRP value and a relatively low RSRQ value may indicate an interfering device. In various examples, the predetermined interference level of the RSRQ may depend on the predetermined interference level of the RSRP and RSRQ as discussed below with reference to FIG. 3.

Figure 3:
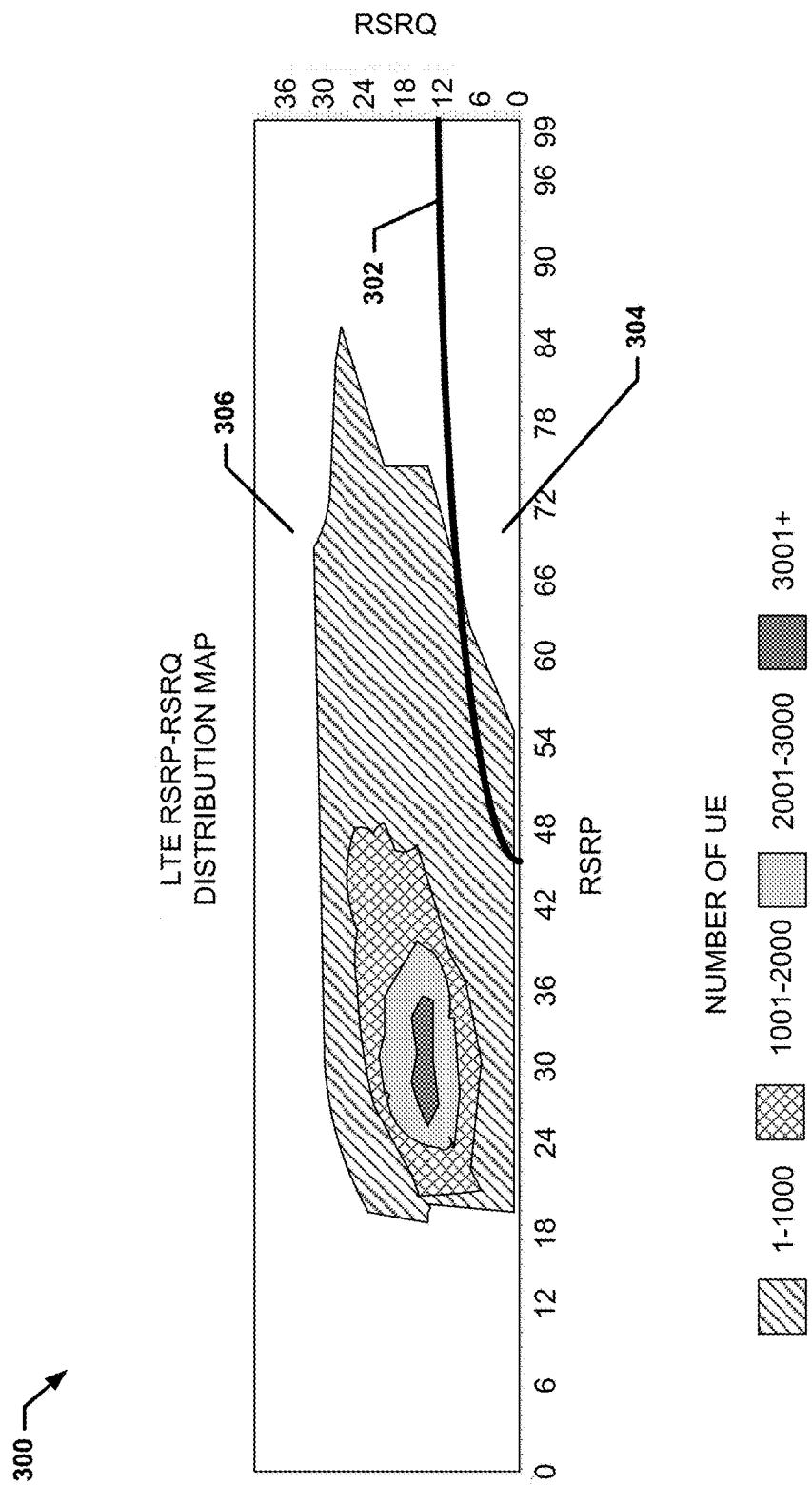
FIG. 3 illustrates an embodiment of a radio frequency measurement distribution map used to determine whether a device is an interfering device.

Referring now to FIG. 3, a radio frequency measurement distribution map 300 is illustrated. The radio frequency measurement distribution map 300 may be a plot of the RSRQ (y-axis) versus the RSRP (x-axis) for each of the UEs in the network environment 100. A predetermined high interferer threshold 302 may be provided that defines a low interferer region 306 and a high interferer region 304. The high interferer region 304 may indicate that the UE can be classified as an interfering device while the low interferer region 306 may indicate that the UE can be classified as a non-interfering device. When determining whether a UE is an interfering device, the one or more base stations 120A-120C of the RAN 120, the aerial traffic management system 130, and/or the core network 135 may determine whether combination of the RSRQ value and the RSRP value received in the measurement report falls within the high interferer region 304. The predetermined high interferer threshold 302 may be any predetermined linear or non-linear function based on the RSRQ value and the RSRP value. As illustrated in FIG. 3, the predetermined high interferer threshold 302 is a non-linear graph defining the high interferer region 304 including UEs that have an RSRP value greater than 45 (e.g., absolute value of 45 dB) and an RSRQ value less than 12 (e.g., absolute value of −12 dB). However, other values and ranges would be apparent to one of skill in the art in possession of the present disclosure. In other embodiments, the predetermined high interferer threshold 302 may be dynamic and shift based on the number UEs and dispersion of those UEs in the radio frequency measurement distribution map 300. For example, the predetermined high interferer threshold 302 may shift to define a region where at least a predetermined percentage of UEs fall within the high interferer region 304 and/or the low interferer region 306. For example, the predetermined high interferer threshold 302 may adjust such that a high interferer region includes 1-3% of all UEs at a given time. In a specific example, the UAV 105 may provide a measurement report that indicates that its RSRP value is 54 and its RSRQ value is 6. The user device 115 may provide a measurement report that indicates that its RSRP value is 30 and its RSRQ value is 18. The UAV 105 may then be classified as potential interfering device because the coordinates of 54 and 6 fall within the high interferer region 304 while the user device 115 is classified as a non-interfering device because the coordinates of 30 and 18 fall within the low interferer region 306.

In various embodiments of decision block 204 the determination as to whether the device is an interfering device based on the first set of information may also be based on the duration that the device corresponds with the interfering device profile. For example, if the UAV 105 is operating within the high interferer region 304 of FIG. 3 for a predefined duration or a predefined percentage of the predefined duration, the UAV 105 may be determined to be an interfering device. For example, if the UAV is operating with the high interferer region for over 15 second, over 30 seconds, over 1 minute, over 5 minutes or other predetermined durations. While specific examples of what information may be used to determine whether a device is an interfering device has been provided, one of skill in the art in possession of the present disclosure would recognize that other information such as, for example, HO frequency or HO triggering frequency, and/or any other information.

If at decision block 204 it is determined that the device is not an interfering device, the method 200 may return to block 202 to wait and receive information from the same device and/or any other UE in the device in the network environment 100. However, if at decision block 204 it is determined that the device is an interfering device, the method 200 then proceeds to block 206, where the device determined to be an interfering device is tracked. In an embodiment of block 206, the one or more base stations 120A-120C of the RAN 120, the aerial traffic management system 130, and/or the core network 135 may track any UE in the network environment 100 that is classified as an interfering device. For example, the UAV 105 may be tracked by detecting an identifier such as, for example, an International Mobile Subscriber Identity (IMSI), an International Mobile Station Equipment Identity (IMEI), and/or any other identifier of the UAV 105 and monitoring for information associated with that identifier. Any UE (e.g., the user device 115) that is not classified as an interfering device may not be tracked.

The method 200 may then proceed to block 208 where a second set of information, during the tracking of the device, is obtained. In an embodiment of block 208, while tracking the UE (e.g., the UAV 115) that is classified as an interfering device, the one or more base stations 120A-120C of the RAN 120, the aerial traffic management system 130, and/or the core network 135 may obtain a second set of information that may be used and analyzed to determine the an interfering device type (e.g., a UAV or other interfering UE such as a tablet, a phone, a wearable device, and one or more situations that the UE may be in to cause interference (e.g., located in a tall building, on a hill, in a ground or aerial vehicle that is at high altitude and the like) that is causing the interference to the cellular network. For example, the second set of information may include physical layer and patterns such as, for example, a three-dimensional speed, a three-dimensional pattern, type of service being consumed (e.g., a voice service or a data service), an interference duration, an UL/DL payload asymmetry, average throughput, altitude of the UE, and/or other information for determining a type of interfering device. The second set of information may also include device specific application layer information. For example, the UAV 105 may provide a command and control channel C2 link and/or a UL video stream. The one or more base stations 120A-120C of the RAN 120, the aerial traffic management system 130, and/or the core network 135 may include one or more sensors and/or use information from communications provided by the UE that is being tracked.

The method 200 then proceeds to block 210 where a type of interfering device is determined based on the second set of information. In various embodiments of block 210, the one or more base stations 120A-120C of the RAN 120, the aerial traffic management system 130, and/or the core network 135 may use the second set of information gathered in block 206 to determine the interfering device type of the interfering device. The second set of information may be computationally processed against various interfering device profiles and if the second set of information is substantially similar (e.g., 70%, 80%, 90%, 95%, 99%, or 100% similar) to information of an interfering device profile, then the interfering device type associated with the interfering device profile may be assigned as the interfering device type of the interfering device. For example, when tracking the UAV 105, the second set of information may indicate that the UAV 105 is moving at 30 miles per hour, the UAV 105 has a higher uplink throughput than a downlink throughput (indicating use of a video camera on the UAV 105 to provide images to a user device), the altitude of the UAV is 100-600 feet above the ground, a high data service use and/or no/low voice data service use, and/or other information. This information may correlate with characteristics of a UAV in a UAV profile. Therefore, the one or more base stations 120A-120C of the RAN 120, the aerial traffic management system 130, and/or the core network 135 may classify the UAV 105 as a UAV device. In another example, the user device 115, which may be smart phone may be located in a skyscraper and accessing the cellular network. The user device 115 may have been classified as an interfering device at decision block 204 due to its altitude and ability to communicate with multiple base stations 120A-120C. The second set of information associated with the user device 115 may indicate that the user device 115 is generally stationary, the user device 115 is at an altitude of 300 feet above the ground, the uplink/downlink throughput is about the same and a voice service is being utilized. This information may correlate with characteristics of a smart phone device in a smart phone profile and/or more specifically a smart phone in a skyscraper. Therefore, the one or more base stations 120A-120C of the RAN 120, the aerial traffic management system 130, and/or the core network 135 may classify the user device 115 as a smart phone at a high altitude.

The method 200 then proceeds to block 212 where an action is performed based on the device type. In an embodiment of block 212, the one or more base stations 120A-120C of the RAN 120, the aerial traffic management system 130, and/or the core network 135 may perform an action based on the device type. For example, the one or more base stations 120A-120C of the RAN 120, the aerial traffic management system 130, and/or the core network 135 may store an association of the identifier of the interfering device with the interfering device type of the interfering device. As such, the next time that the interfering device is detected, the one or more base stations 120A-120C of the RAN 120, the aerial traffic management system 130, and/or the core network 135 may not need to repeat the method 200 in determining that the UE is an interfering device and its interfering device type.

In another example, the one or more base stations 120A-120C of the RAN 120, the aerial traffic management system 130, and/or the core network 135 may assign a different communication channel to the UAV 105 based on the one or more base stations 120A-120C of the RAN 120, the aerial traffic management system 130, and/or the core network 135 classifying the UAV 105 as a UAV. The aerial traffic management system 130 may adjust radio channel allocation instructions based on the interfering device type. The adjustment to the radio channel allocation instructions and communication channel may be referred to as a communication channel modification. The adjusted radio channel allocation instructions may include an adjustment to one or more of a frequency band allocatable to the UAV 105, a bit rate allocatable to the UAV 105, or a communication protocol for the UAV 105. For example, the adjustment of the communication protocol may be to migrate the UAV 105 from 4G LTE communication protocol to 4G LTE-M communication protocol (e.g., generally associated with lower bit rate than 4G LTE), to migrate the UAV 105 from 4G LTE communication protocol to UMTS, or other adjustment.

In other examples, the action may be to provide a notification to an administrator that includes the interfering device type of the UE. In yet other examples, the one or more base stations 120A-120C of the RAN 120, the aerial traffic management system 130, and/or the core network 135 may generate mitigation instructions for the UE based on the interfering device type of the UE. While specific examples of the action performed based on the interfering device type of the UE have been discussed one of skill in the art in possession of the present disclosure would recognize that other actions may be performed based on the interfering device type without departing from the scope of the present disclosure. For example, the throughput of the device may be throttled back (e.g., reducing the throughput by a predefined percentage or predefined value).

Figure 4:
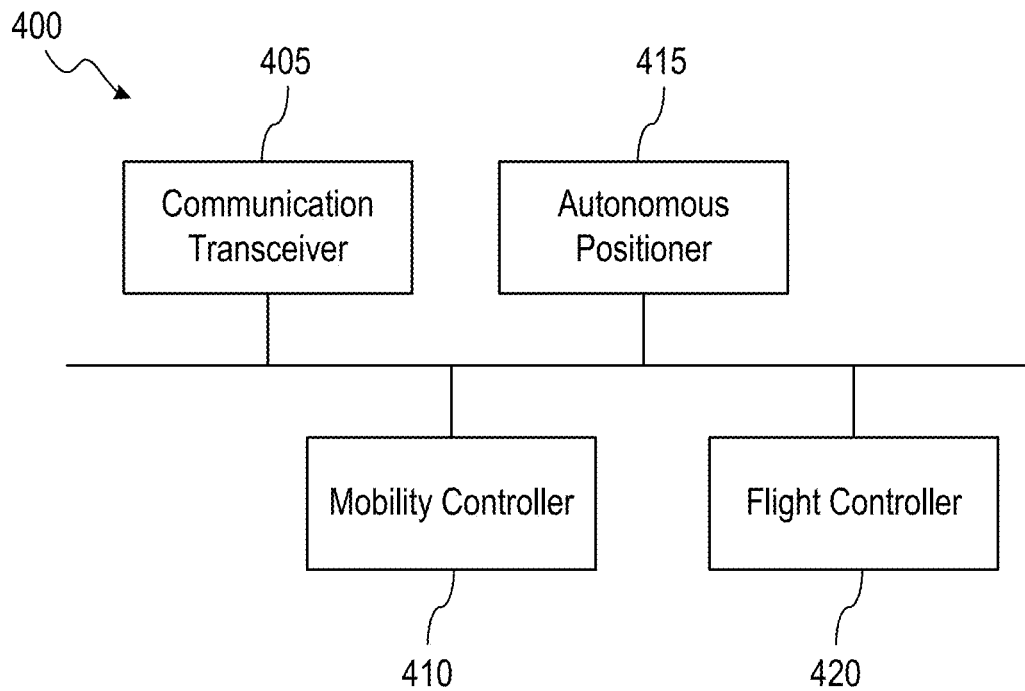
FIG. 4 illustrates a block diagram of an example of a UAV processing unit in accordance with one or more embodiments of the present disclosure.

FIG. 4 illustrates a block diagram of an example of a UAV processing unit 400 in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. For explanatory purposes, the UAV processing unit 400 is described herein with reference to the example network environment 100 of FIG. 1; however, the UAV processing unit 400 is not limited to the example network environment 100 of FIG. 1. In an aspect, the UAV 105 includes the UAV processing unit 400.

The UAV processing unit 400 may include a communication transceiver 405, a mobility controller 410, an autonomous positioner 415, a flight controller 420, and a flight rule controller 425. The communication transceiver 405 may implement appropriate physical layer(s) and protocol stack(s) to enable communication between the UAV 105 and the user device 115, base stations 120A-C, aerial traffic management system 130, and/or core network 135. For example, the communication transceiver 405 may include an LTE transceiver module for implementing an LTE physical layer and LTE protocol stack, and/or any other 3G, 4G, and/or 5G transceiver module(s), and/or satellite network transceiver module(s), and/or other transceiver module(s) associated with other wireless protocols/applications. The communication transceiver 405 may allow the UAV 105 to transmit messages to and/or receive messages from the user device 115, base stations 120A-C, aerial traffic management system 130, and/or core network 135 using the antenna 110 and/or other antenna. In some cases, data transmissions to and from the UAV 105 may occur over communication channels (e.g., physical communication channels) defined by a serving base station based on channel allocation instructions from the aerial traffic management system 130.

The mobility controller 410 may implement any control and feedback operations appropriate for interacting with the avionics, control actuators, and/or other equipment included in the flight control unit to fly the UAV 105, including, but not limited to, taking off, landing, and/or setting/adjusting direction, velocity, and/or acceleration of the UAV 105. In some cases, the mobility controller 410 may receive commands from the user device 115, base stations 120A-C, aerial traffic management system 130, and/or core network 135, to, for example, configure a flight route (e.g., program a flight route), adjust a programmed flight route, deploy the UAV 105, land the UAV 105, navigate the UAV 105, and/or other commands that facilitate navigating the UAV 105 and utilizing the UAV 105 to perform an action. In some cases, the mobility controller 410 may receive commands to move and/or rotate the UAV 105 and/or component thereof (e.g., the antenna 110).

The autonomous positioner 415 may be utilized to monitor (e.g., autonomously monitor) a current position of the UAV 105. The autonomous positioner 415 may include, or may be in communication with (e.g., via the communication transceiver 405), a GPS that provides the position of the UAV 105. In some cases, the autonomous positioner 415 may implement location determination techniques. In an aspect, the autonomous positioner 415 may determine a positional difference between the UAV 105 and a base station (e.g., the base station 120A) based on the position information of the UAV 105 and the base station. For example, the autonomous positioner 415 may generate signals (e.g., for the mobility controller 410) that cause rotation and/or movement of the antenna 110 (e.g., a directional antenna).

The flight controller 420 may be utilized to identify the current position of the UAV 105 (e.g., provided by the autonomous positioner 415) relative to positions in a pre-programmed flight route. The flight controller 420 may receive and process information from onboard sensors, base stations 120A-C, aerial traffic management system 130, core network 135, and/or other devices to determine whether to maintain the UAV 105 on the pre-programmed flight route or to deviate from the pre-programmed flight route (e.g., to avoid a collision). The flight controller 420 may generate control signals that cause the mobility controller 410 to fly the UAV 105 along a route specified by the control signals, which may or may not differ from the pre-programmed flight route, and/or control signals that cause movement and/or rotation of the UAV 105 and/or component thereof.

Figure 5:
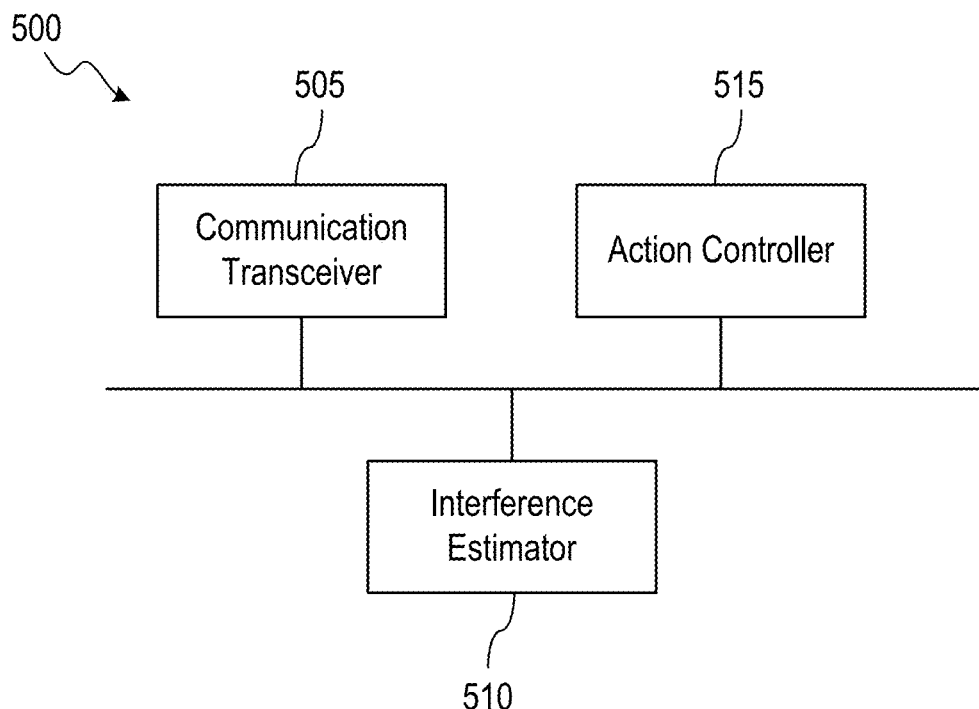
FIG. 5 illustrates a block diagram of an example of a communication channel allocation unit in accordance with one or more embodiments of the present disclosure.

FIG. 5 illustrates a block diagram of an example of a communication channel control unit 500 in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. For explanatory purposes, the communication channel control unit 500 is described herein with reference to the base station 120A in the example network environment 100 of FIG. 1; however, the communication channel control unit 500 is not limited to the base station 120A or the example network environment 100 of FIG. 1.

The communication channel control unit 500 may include a communication transceiver 505, an interference estimator 510, and an action controller 515. The communication transceiver 505 may implement appropriate physical layer(s) and protocol stack(s) to enable communication between the base station 120A and UEs (e.g., the UAV 105, the ground-based UE 115), other base stations of the RAN 120, aerial traffic management system 130, and/or core network 135. The communication transceiver 505 may relay messages between UEs, aerial traffic management system 130, and/or core network 135. In an embodiment, the communication transceiver 505 may receive UE measurement reports from UEs served by the base station 120A and network policies from the aerial traffic management system 130 and/or core network 135.

The interference estimator 510 may determine (e.g., estimate, monitor) an interference impact to the cellular network of UEs served by the base station 120A. The interference estimator 510 may determine whether each UE in the network environment is an interfering device and if so, the interfering device type of that interfering devise. In an aspect, to determine the interference impact of the UAV 105, the interference estimator 510 may determine path losses between the UAV 105 and one or more base stations of the cellular network and/or other values associated with determining the interference impact. In some cases, the interference impact may be based at least in part on information contained in UE measurement reports, such as RSRP values and/or RSRQ values.

The action controller 515 may determine whether to perform mitigation actions of UEs (e.g., including the UAV 105) based on the determined interference impact, when to send a notification to an administrator of the network environment, when to perform channel allocation, and/or other actions based on the interfering device type. When the action controller 515 makes the determination to perform dedicated uplink power control, the action controller 515 may determine the UE transmit power to be utilized by the UAV 105. The action controller 515 may determine the UE transmit power based on path losses, an associated ground-based path loss difference, and/or other factors. The action controller 515 may determine power parameters (e.g., $M_{pusch}$, $P_{0\ nominal\ pusch}$, $P_{0\ UE\ pusch}$, $\alpha$, $\Delta TF$, $f$, and $\beta$ for PUSCH) to be utilized by the UAV 105 to implement the UE transmit power. The action controller 515 may transmit the power parameters to the UAV 105 via the communication transceiver 505. When the action controller 515 makes the determination to perform channel allocation, the action controller 515 may assign a communication channel (e.g., physical communication channel) to a UE based on channel allocation instructions from the aerial traffic management system 130, which is based on the interfering device type. The channel allocation instructions may indicate one or more of a frequency band allocatable to a UE, a bit rate allocatable to the UE, or a communication protocol for the UE. Within the boundaries set by the channel allocation instructions, the channel allocation controller 510 may assign a communication channel to the UE based on radio resource management of the base station 120A.

While an example manner of implementing the UAV processing unit 400 and communication channel control unit 500 are illustrated in FIGS. 4 and 5, respectively, one or more of the components (e.g., elements, processes, and/or devices) illustrated in FIGS. 4 and 5 may be combined, divided, re-arranged, omitted, eliminated, and/or implemented in any other way. Further, the various components (e.g., 405, 410, 415, 420, 505, 510, 515, 520) may be implemented by hardware, software, firmware, and/or any combination of hardware, software, and/or firmware. Thus, for example, any of these components, and/or, more generally, the UAV processing unit 400 and communication channel control unit 500 may be implemented by one or more analog and/or digital circuits, logic circuits, programmable processors, application specific integrated circuits (ASICs), programmable logic devices (PLDs), and/or field programmable logic devices (FPLDs). In this regard, when implemented using circuitry, the UAV processing unit 400 and communication channel control unit 500 may be referred to as UAV processing circuit and communication channel control circuit, respectively.

When reading any claims as set forth herein to cover purely software and/or firmware implementations, at least one of the units or components in FIGS. 4 and 5 is hereby expressly defined to include a tangible computer readable storage device or storage disk such as a memory, digital versatile disk (DVD), compact disk (CD), a Blu-ray disc™, and/or other storage device/disk storing the software and/or firmware.

Figure 6:
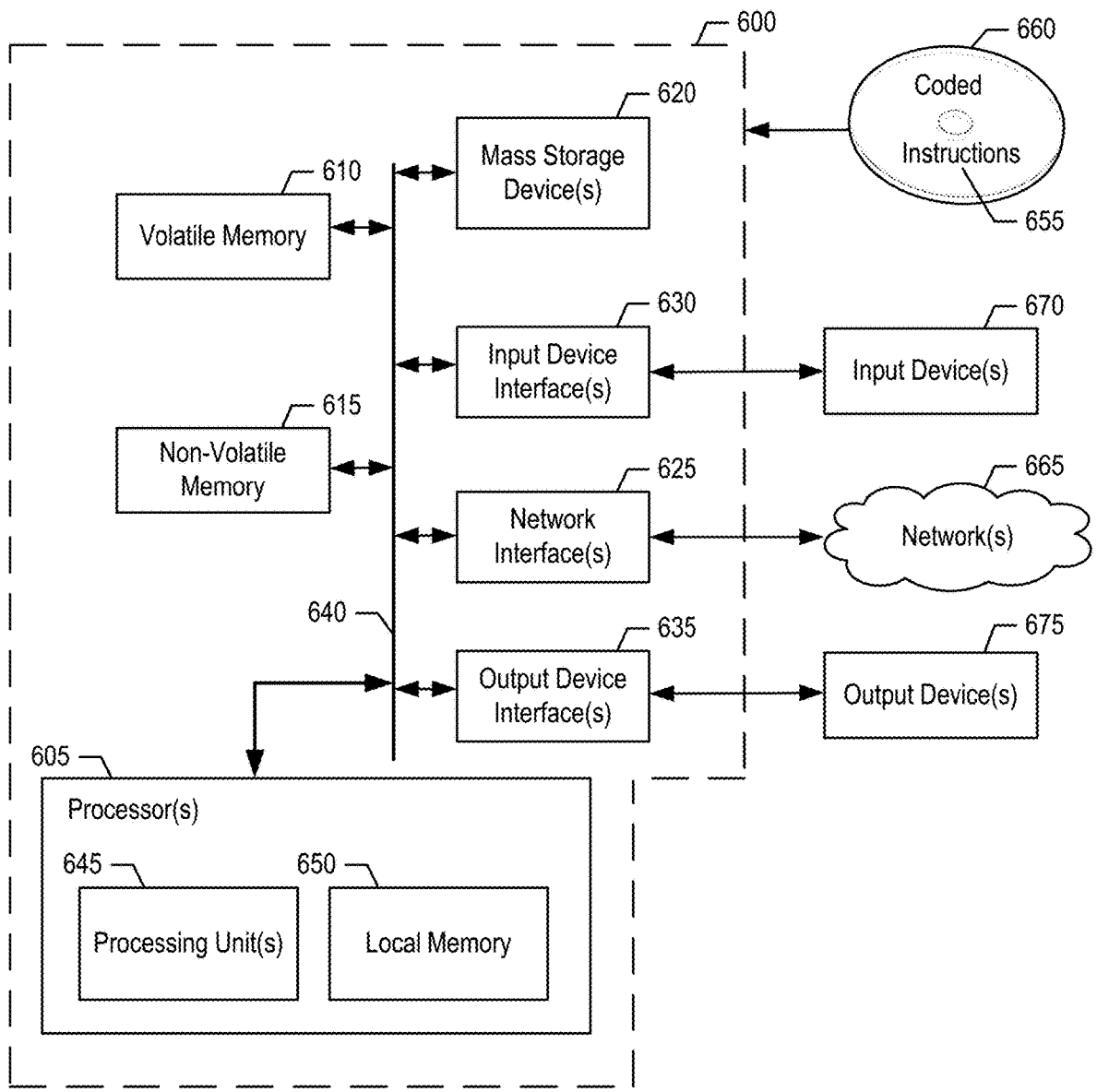
FIG. 6 illustrates a block diagram of an example of an electronic system with which one or more embodiments of the present disclosure may be implemented.

FIG. 6 illustrates a block diagram of an example of an electronic system 600 with which one or more embodiments of the present disclosure may be implemented. In an embodiment, the electronic system 600 may be, may include, or may be referred to as, processor platform. The electronic system 600 can generally be any type of computing device. In an embodiment, the electronic system 600 can be, can include, and/or can be a part of, one or more of the UAV 105, user device 115, base stations 120A-C, aerial traffic management system 130, core network 135 (e.g., MME of the core network 135) shown in FIG. 1. For example, the electronic system 600 may be, may include, or may be a part of, the UAV 105.

The electronic system 600 includes one or more processors 605, volatile memory 610, non-volatile memory 615, one or more mass storage devices 620, one or more network interfaces 625, one or more input device interfaces 630, one or more output device interfaces 635, and a link 640. The link 640 may be, may include, or may be implemented by, a bus, one or more point-to-point connections (e.g., intrachip connections and/or inter-chip connections), and/or other connections for facilitating connection of and/or communication between various components of the electronic system 600.

The link 640 couples (e.g., connects) to the processor(s) 605. In an aspect, the processor(s) 605 of the illustrated example is hardware. For example, the processor(s) 605 can be implemented by one or more integrated circuits, logic circuits, processors, and/or controllers from any desired family or manufacturer. The processor(s) 605 includes one or more processing units 645 configured via instructions 655 stored in a local memory 650 (e.g., a cache) of the processor(s) 605. In an aspect, the instructions 655 may include instructions that when executed, perform at least some instructions of FIGS. 4 and 5 and/or to implement the one or more of the units 400 and 500 of FIGS. 4 and 5. The processor(s) 605 is in communication with the volatile memory 610, non-volatile memory 615, and the mass storage device(s) 620 via the link 640. In an aspect, the processor(s) 605 may be, may include, or may be a part of, the UAV processing unit 400 of FIG. 4 or the communication channel allocation unit 500 of FIG. 5. In an aspect, the processing units 645 may be, may include, or may be a part of, the UAV processing unit 400 of FIG. 4 or communication channel allocation unit 500 of FIG. 5.

The link 640 couples (e.g., connects) to the volatile memory 610, non-volatile memory 615, and mass storage device(s) 620. The volatile memory 610 may include synchronous dynamic random access memory (SDRAM), dynamic RAM (DRAM), static RAM (SRAM) Rambus dynamic RAM (RDRAM), and/or other types of volatile memory. The non-volatile memory 615 may include read-only memory (ROM), programmable ROM (PROM), erasable programmable ROM (EPROM), electrically erasable programmable (EEPROM), flash memory, non-volatile RAM (NVRAM), and/or other types of non-volatile memory. The non-volatile memory 615 may store instructions and data even when the electronic system 600 is off. The mass storage device(s) 620 may include floppy disk drives, hard disk drives, compact disk drives, DVD drives, Blu-ray disc™ drives, redundant array of independent disks (RAID) systems, solid state memories, and/or other devices that allow storage. Access to the volatile memory 610, non-volatile memory 615, and mass storage device(s) 620 may be controlled by a memory controller (not shown). In an aspect, the coded instructions 655 corresponding to at least some instructions of FIGS. 4 and/or 5 may be stored in the volatile memory 610, non-volatile memory 615, mass storage device(s) 620, local memory 650, and/or on a removable tangible computer readable storage medium, such as a disk 660 (e.g., CD, DVD, or Blu-ray disc™).

The link 640 couples (e.g., connects) to the network interface(s) 625. The network interface(s) 625 may couple the electronic system 600 to one or more networks 665. In this manner, the electronic system 600 can be a part of a network of devices, such as a local area network (LAN), a WAN, or an Intranet, or a network of networks, such as the Internet. In an embodiment, the network interface(s) 625 may facilitate communication between the electronic system 600 and a cellular network, such as a cellular network that includes the RAN 120, aerial traffic management system 130, and/or core network 135 of FIG. 1. In this regard, the network interface(s) 625 may also facilitate communication between the electronic system 600 and the user device 115. The network interface(s) 625 may be implemented by any type of interface standard, such as an Ethernet interface, a universal serial bus (USB) interface, a PCI express interface, a wireless network interface (e.g., wireless LAN interface), a cellular network interface, and/or other interfaces. For example, a cellular network interface may provide support for Global System for Mobile Communications (GSM)-based cellular networks, code division multiple access (CDMA)-based cellular networks, and/or other cellular networks. The network interface(s) 625 may include a communication device such as a transmitter, receiver, transceiver, modem, and/or network interface card to facilitate exchange of data with external machines (e.g., computing devices of any kind) via the network(s) 665. In an aspect, the network interface(s) 625 may be structured to implement the communication transceiver 405 or 505 of FIG. 4 or 5.

The link 640 couples (e.g., connects) to the input device interface(s) 630. The input device interface(s) 630 may couple the electronic system 600 to one or more input devices 670. The input device(s) 670 may enable a user to provide (e.g., enter) data and commands to the electronic system 600. For example, the user may be an operator of the UAV 105 when the electronic system 600 is disposed on the UAV 105 or when the electronic system 600 is a remote control device (e.g., the user device 115) of the UAV 105. The input device(s) 670 may include, for example, an audio sensor, a microphone, a camera (still or video), a voice recognition system, a keyboard (e.g., a physical or virtual keyboard), a cursor control device (e.g., a mouse), a touchscreen, and/or other devices for providing user input to the electronic system 600. Also, many systems, such as the electronic system 600, can allow a user to provide data and commands using physical gestures, such as, but not limited to, hand or body movements, facial expressions, and face recognition. In this regard, the user input may be received in any form, such as audio (e.g., speech), visual, and/or tactile. For example, in an aspect, to adjust a flight path of a UAV (e.g., the UAV 105) that is, includes, or is a part of the electronic system 600, the user may enter text via a physical keyboard communicatively connected to the electronic system 600 via the input device interface(s) 630. The text input may be relayed to the processor(s) 605 via the input device interface(s) 630 and the link 640. The processor(s) 605 may process the text input into commands to adjust the flight path of the UAV and facilitate implementation of the commands.

The link 640 couples (e.g., connects) to the output device interface(s) 635. The output device interface(s) 635 may couple the electronic system 600 to one or more output devices 675. The output device interface(s) 635 may include a graphics and/or audio driver card, graphics and/or audio driver chip, and/or graphics and/or audio driver processor. The output device(s) 675 may enable the electronic system 600 to provide output information to a user. The output device(s) 675 may include, for example, display devices (e.g., a light emitting diode (LED), an organic LED (OLED), a liquid crystal display (LCD)), audio devices (e.g., speakers), audiovisual devices, and/or other output devices. In this regard, the output information may provide feedback to the user in any form, such as visual feedback, auditory feedback, and/or tactile feedback. For example, in an aspect, a UAV (e.g., the UAV 105) that is, includes, or is a part of the electronic system 600 may provide operational characteristics, such as remaining battery power, remaining fuel level, remaining actions to be performed, current position in a flight path, component health (e.g., engine health, battery health), to a display coupled to the UAV (e.g., wired or wirelessly coupled) via the output device interface(s) 635 and viewable by the user.

In one or more embodiments, FIGS. 4 and 5 illustrate example machine readable instructions for the UAV processing unit 400 and/or components thereof and/or communication channel allocation unit 500 and/or components thereof. In these examples, the machine readable instructions may include one or more programs for execution by one or more processors, such as the processor(s) 605 shown in the electronic system 600. The one or more programs, or portion(s) thereof, may be embodied in software stored on a tangible computer readable storage medium, such as a CD-ROM, a floppy disk, a hard drive, a DVD, a Blu-ray disc™, and/or a memory associated with the processor(s) 605, but the entire program or programs and/or portions thereof may alternatively be executed by a device other than the processor(s) 605, and/or embodied in firmware or dedicated hardware (e.g., implemented by an ASIC, a PLD, an FPLD, discrete logic, etc.). Further, although the example program(s) is described with reference to the flow diagrams illustrated in FIGS. 4 and 5, many other methods may be used. For example, with reference to the flow diagrams illustrated in FIGS. 4 and 5, the order of execution of the blocks may be changed, and/or some of the blocks described may be changed, removed, combined, and/or subdivided into multiple blocks.

The example processes 400 and 500 of FIGS. 4 and 5, respectively, may be using coded instructions (e.g., computer and/or machine readable instructions) stored on a tangible computer readable storage medium such as a hard disk drive, flash memory, ROM, RAM, CD, DVD, cache and/or any other storage device or storage disk in which information is stored for any duration (e.g., for extended time periods, permanently, for brief instances, for temporarily buffering, and/or for caching of the information). Alternatively or in addition, the example processes 400 and 500 of FIGS. 4 and 5, respectively, may be implemented using coded instructions (e.g., computer and/or machine readable instructions) stored on a non-transitory computer and/or machine readable medium such as a hard disk drive, flash memory, ROM, RAM, CD, DVD, cache and/or any other storage device or storage disk in which information is stored for any duration (e.g., for extended time periods, permanently, for brief instances, for temporarily buffering, and/or for caching of the information). As used herein, the terms "tangible computer readable storage medium" and "non-transitory computer readable medium" are expressly defined to include any type of computer readable storage device and/or storage disk and to exclude propagating signals and to exclude transmission media. As used herein, "tangible computer readable storage medium" and "tangible machine readable storage medium" are used interchangeably.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of the present disclosure is not limited to such standards and protocols. For instance, each of the standards for Internet and other packet switched network transmission (e.g., Transmission Control Protocol (TCP)/Internet Protocol (IP), User Datagram Protocol (UDP)/IP, Hypertext Markup Language (HTML), Hypertext Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by the present disclosure and are intended to be included within the scope of the accompanying claims.

Additionally, although embodiments of the present disclosure provide example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the foregoing provides example systems, methods, and articles of manufacture, the examples are not the only way to implement such systems, methods, and articles of manufacture. Therefore, although certain example methods, apparatus, and articles of manufacture have been described herein, the scope of coverage of the present disclosure is not limited thereto. On the contrary, the present disclosure covers all methods, apparatus, and articles of manufacture fairly falling within the scope of the claims either literally or under the doctrine of equivalents.

What is claimed is:

1. A method, comprising:
   receiving, via a cellular network, information corresponding with data communications between a device and the cellular network;
   determining, based on correspondence between the information and an interfering device profile, that the data communications cause interference on the cellular network;
   determining an interfering device type of the device based on the information; and
   performing, based on the interfering device type and while the device is in an active interfering mode, a mitigation action to mitigate the interference on the cellular network caused by the data communications between the device and the cellular network and to transmit with sufficient power to maintain connectivity.

2. The method of claim 1, wherein the mitigation action includes performing a communication channel modification.

3. The method of claim 1, wherein the mitigation action includes throttling back a throughput of the device.

4. The method of claim 1, wherein the mitigation action includes adjusting radio channel allocation instructions that adjusts at least one of a frequency band allocatable to the device, a bit rate allocatable to the device, or a communication protocol for the device.

5. The method of claim 1, further comprising:
   providing a notification to an administrator device associated with an administrator that includes the interfering device type of the device.

6. The method of claim 1, wherein at least a first portion of the information is provided in a measurement report from the device that includes signal strength measurements of the device and signal quality measurements of the device.

7. The method of claim 6, wherein the determining of the device is an interfering device type of the device is based on the signal strength measurements satisfying a predetermined signal strength threshold and the signal quality measurements satisfying a predetermined quality threshold.

8. The method of claim 6, wherein at least a second portion of the information includes at least one of a speed of the device, a location of the device over a time period, a service type, throughput asymmetry between uplink and downlink, a persistence that the device satisfies a predetermined interference threshold, an altitude of the device, an application being executed by the device, and uplink video streaming.

9. The method of claim 1, wherein the device comprises an unmanned aerial vehicle.

10. A management system, comprising:
    one or more processors; and
    a non-transitory machine readable medium comprising instructions stored therein, which when executed by the one or more processors, cause the one or more processors to perform operations comprising:
       receiving, via a cellular network, information corresponding with data communications between a device and the cellular network;
       determining, based on correspondence between the information and an interfering device profile, that the data communications cause interference on the cellular network and an interfering device type of the device; and
       performing, based on the interfering device type and while the device is in an active interfering mode, a mitigation action to mitigate the interference on the cellular network caused by the data communications between the device and the cellular network and to transmit with sufficient power to maintain connectivity.

11. The management system of claim 10, wherein at least a first portion of the information is provided in a measurement report from the device and that includes signal strength measurements of the device and signal quality measurements of the device.

12. The management system of claim 11, wherein the determining of the interfering device type of the device is based on the signal strength measurements satisfying a predetermined power threshold and the signal quality measurements satisfying a predetermined quality threshold.

13. The management system of claim 11, wherein a second portion of the information includes at least one of a speed of the device, a location of the device over a time period, a service type, throughput asymmetry between uplink and downlink, a persistence that the device satisfies a predetermined interference threshold, an altitude of the device, an application being executed by the device, and uplink video streaming.

14. The management system of claim 13, wherein the interfering device type of the device is determined based on at least the second portion of the information.

15. A user equipment, comprising:
    one or more processors; and
    a non-transitory machine readable medium comprising instructions stored therein, which when executed by the one or more processors, cause the one or more processors to perform operations comprising:
       receiving a first set of information associated with data communications of a device utilizing a cellular network;
       providing, via the cellular network, information corresponding to with data communications between the one or more processors and the cellular network;
       receiving, in response to providing the information corresponding with data communication between the one or more processors and the cellular network, mitigation instructions to perform a mitigation action to mitigate interference on the cellular network caused by the data communications between the one or more processors and the cellular network and to transmit with at least threshold power to maintain connectivity, wherein the mitigation instructions were provided via the cellular network, to the one or more processors in response to at least one of a management device or a base station, which are part of the cellular network, determining, based on correspondence between the information and an interfering device profile, that the data communications cause interference on the cellular network and an interfering device type of the user equipment; and
       executing the mitigation instructions to perform the mitigation action to mitigate the interference on the cellular network caused by the data communications between the one or more processors and the cellular network and to transmit with at least the threshold power to maintain connectivity.

16. The user equipment of claim 15, wherein the mitigation action includes adjusting at least one of a frequency band, a bit rate, or communication protocol in the data communications between the one or more processors and the cellular network.

17. The user equipment of claim 15, wherein at least a first portion of the information is provided in a measurement report that includes signal strength measurements of the user equipment and signal quality measurements of the user equipment.

18. The user equipment of claim 15, wherein at least a portion of the information includes at least one of a speed of the device, a location of the device over a time period, a service type, throughput asymmetry between uplink and downlink, a persistence that the device satisfies a predetermined interference threshold, an altitude of the device, an application being executed by the one or more processors, and uplink video streaming.

19. The user equipment of claim 15, wherein the one or more processors and the non-transitory machine readable medium are coupled to a housing of an unmanned aerial vehicle.

20. The user equipment of claim 15, wherein the operations further comprise:
providing, via the cellular network, subsequent information corresponding with subsequent data communications between the one or more processors and the cellular network at a time subsequent to the data communications on which the information is based.

* * * * *